United States Patent
Shamma et al.

(10) Patent No.: US 10,803,293 B2
(45) Date of Patent: Oct. 13, 2020

(54) SYSTEM AND METHOD FOR SEMANTIC OR VISUAL COLLABORATIVE AUGMENTED REALITY

(71) Applicant: FUJI XEROX CO., LTD., Minato-ku, Tokyo (JP)

(72) Inventors: David A. Shamma, San Francisco, CA (US); Laurent Denoue, Vento (IT); Matthew L. Cooper, San Francisco, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 161 days.

(21) Appl. No.: 15/955,586

(22) Filed: Apr. 17, 2018

(65) Prior Publication Data

US 2019/0318150 A1 Oct. 17, 2019

(51) Int. Cl.
*G06K 9/00* (2006.01)
*G06F 3/01* (2006.01)
*G06T 19/00* (2011.01)

(52) U.S. Cl.
CPC .......... *G06K 9/00214* (2013.01); *G06F 3/011* (2013.01); *G06K 9/00671* (2013.01); *G06T 19/006* (2013.01)

(58) Field of Classification Search
None
See application file for complete search history.

(56) References Cited

U.S. PATENT DOCUMENTS

| 8,970,623 | B2 | 3/2015 | Hayakawa |
| 9,122,391 | B2 | 9/2015 | Lee et al. |
| 2012/0249741 | A1* | 10/2012 | Maciocci ............. G06T 15/503 348/46 |

OTHER PUBLICATIONS

Sodhi, Rajinder S., et al. "BeThere: 3D mobile collaboration with spatial input." Proceedings of the SIGCHI Conference on Human Factors in Computing Systems. ACM, 2013. (Year: 2013).*
Gauglitz, Steffen, et al. "Integrating the physical environment into mobile remote collaboration." Proceedings of the 14th international conference on Human-computer interaction with mobile devices and services. ACM, 2012. (Year: 2012).*
Gauglitz, Steffen, et al. "World-stabilized annotations and virtual scene navigation for remote collaboration." Proceedings of the 27th annual ACM symposium on User interface software and technology. ACM, 2014. (Year: 2014).*

(Continued)

*Primary Examiner* — Vu Le
*Assistant Examiner* — Tracy Mangialaschi
(74) *Attorney, Agent, or Firm* — Procopio, Cory, Hargreaves & Savitch LLP (57) ABSTRACT

An augmented reality (AR) environment synchronization method, includes, for each of a plurality of devices associated with respective users in the AR environment, receiving plane information, and generating object/unique identifier information; across the devices, coordinating the plane information; performing context-aware matching of the object/unique identifier information across the devices to generate a match between respective objects sensed by the devices; and providing synchronization control to the devices, to permit an annotation of the matched object to be locked to a landmark and the plane of one of the devices with respect to others of the devices.

20 Claims, 7 Drawing Sheets
(4 of 7 Drawing Sheet(s) Filed in Color)

(56) References Cited

OTHER PUBLICATIONS

Oda, Ohan, et al. "Virtual replicas for remote assistance in virtual and augmented reality." Proceedings of the 28th Annual ACM Symposium on User Interface Software & Technology. ACM, 2015. (Year: 2015).*

Adcock, Matt, and Chris Gunn. "Using projected light for mobile remote guidance." Computer Supported Cooperative Work (CSCW) 24.6 (2015): 591-611. (Year: 2015).*

How mixed reality could spice up bricks-and-mortar shopping, Rakuten Today, Oct. 5, 2017, URL: https://rakuten.today/blog/mixed-reality-changing-shopping.html. (2 pages).

Don Kimber, "iLight: Remote annotation on physical objects" Oct. 2004, URL: http://www.fxpal.com/research-projects/ilight/. (5 pages).

Iyoda, T. et al. "LightCollabo: Distant Collaboration Support System for Manufacturers" Springer Berlin Heidelberg, 2008, pp. 369-379, Berlin, Heidelberg. (11 pages).

Brad Dwyer "Magic sudoku" URL: http://magicsudoku.com, Oct. 2004. (3 pages).

Gauglitz, S. et al. "World-Stabilized Annotations and Virtual Scene Navigation for Remote Collaboration" IUIST'14, Oct. 5-8, 2014, pp. 449-459, Honolulu, HI, USA. (11 pages).

Gauglitz, S. et al. "In Touch with the Remote World:Remote Collaboration with Augmented Reality Drawings and Virtual Navigation" In Proceedings of the 20th ACM Symposium on Virtual Reality Software and Technology, pp. 197-205, 2014. (9 pages).

Adcock, M. et al. RemoteFusion: Real Time Depth Camera Fusion for Remote Collaboration on Physical Tasks. In VRCAI 2013, Nov. 17-19, 2013, pp. 235-242, Hong Kong. (8 pages).

Fakourfar, O. et al., "Stabilized Annotations for Mobile Remote Assistance" In Proceedings of the 2016 CHI Conference on Human Factors in Computing Systems, CHI'16, May 7-12, 2016, pp. 1548-1560, San Jose, CA, USA. (13 pages).

Adcock, M. et al. Using projected light for mobile remote guidance. Computer Supported Cooperative Work (CSCW), 2015, pp. 591-611, vol. 24(6). (21 pages).

Kurata, T. et al., "Remote Collaboration using a Shoulder-Worn Active Camera/Laser", In Wearable Computers, 2004, pp. 62-69, vol. 1. (8 pages).

Palmer, D. et al., "Annotating with Light for Remote Guidance" OzCl II 2007, Nov. 28-30, 2007, pp. 103-110, Adelaide, Australia. (8 pages).

Okuma, T. et al., "VizWear-3D: A Wearable 3-D Annotation System Based on 3-D Object Tracking using a Condensation Algorithm" In Proceedings of the IEEE Virtual Reality, 2002, pp. 295-296. (2 pages).

Wither, J. et al., "Annotation in outdoor augmented reality" Computers & Graphics, 2009, pp. 679-689, vol. 33(6). (11 pages).

Krishna, R. et al., "Visual Genome: Connecting Language and Vision Using Crowdsourced Dense Image Annotations" International Journal of Computer Vision (2017) pp. 32-73, vol. 123. (42 pages).

* cited by examiner

SYSTEM AND METHOD FOR SEMANTIC OR VISUAL COLLABORATIVE AUGMENTED REALITY

BACKGROUND

Field

Aspects of the example implementations relate to methods, systems, and interfaces for providing synchronous, anchored real time annotations across similar media objects in an augmented reality (AR) environment. More specifically, the example implementations are directed to methods, systems and interfaces in which an AR plane is determined for each AR input (e.g., camera), followed by a unique identifier being computed for each AR input to determine an origin of objects, followed by coordination across AR inputs, matching of unique identifiers to match objects in different AR inputs, and for the matching objects, coordination among peers in the AR environment for annotation control and management.

Related Art

Figure 1:
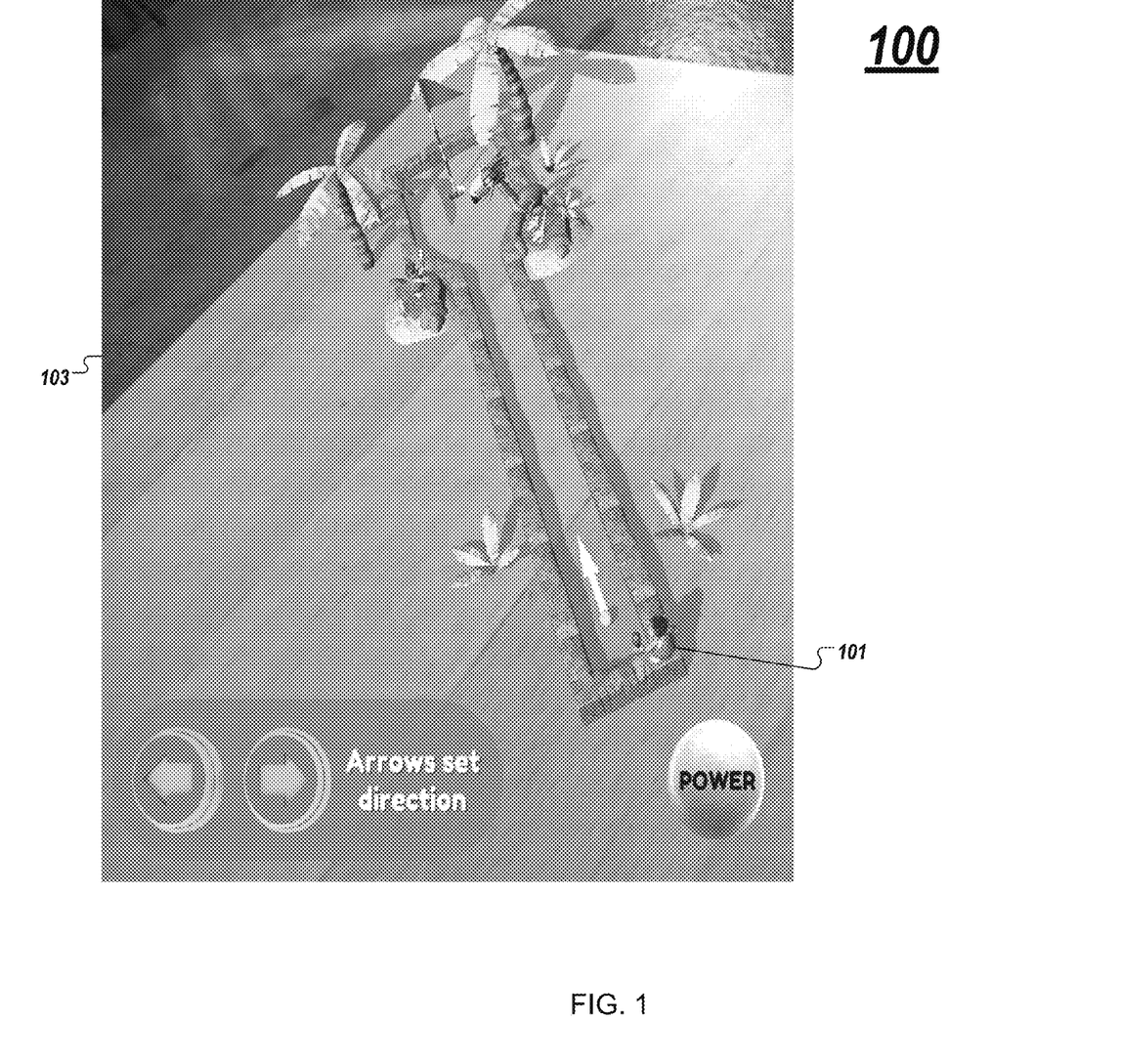
FIG. 1 illustrates a related art AR experience.

Augmented Reality (AR) experiences are growing in the related art, with the proliferation of input devices such as mobile cameras and head mounted displays, and their associated APIs. These related art AR experiences may include objects dropped in the world for a single viewer, as seen mostly in the game community. FIG. 1 illustrates an AR game 100. More specifically, a user drops a game board 101 into a world 103, and plays the game. These AR experiences are generally single-entity (e.g., single-person) engagements.

For related art shared AR experiences involving multiple entities (e.g., peer to peer), such as in gaming-related applications, entities are usually co-located (e.g., in the same physical space) or distributed via a shared projected object (e.g., chess board), wherein the shared projected object is inserted (e.g., dropped in) to locations.

In the related art, object recognition is used to provide sidebar annotations. This related art approach may provide one or more users with "just in time" information requirements. However, this related art approach has limitations and disadvantages.

For example, the related art use of object recognition to provide sidebar annotations lacks collaborative connectivity. Moreover, multiple users in a shared AR experience may see the same (e.g., pseudo-projected) game board. However, the mixed reality AR experience cannot use this related art approach, at least because mixed reality systems require more than a simple plane for AR manipulations.

For example, but not by way of limitation, in a mixed reality AR environment, one must determine if there is an object that is the base of the manipulations, move the corresponding annotations if the base is moved, and coordinate these movements across one or more users in the mixed reality environment. For example, if the base object is moved by one of the users, the movement of that base object should not propagate to one or more other users in the mixed reality environment. In comparison, for the AR game of FIG. 1, because there is no mixed interaction, it does not matter where the game is dropped, in terms of the real-world environment.

In the related art, a shared drop point for a media object also has limitations and disadvantages. For example, it is necessary to create a shared reference view for object annotation, to negotiate how annotations on that object are jointly shared and manipulated, and to detect when an action of one entity may interfere with an experienced another entity. Accordingly, there is an unmet need in the related art.

SUMMARY

Aspects of the present application may relate to an augmented reality (AR) environment synchronization method, comprising: for each of a plurality of devices associated with respective users in the AR environment, receiving plane information, and generating object/unique identifier information; across the devices, coordinating the plane information; performing context-aware matching of the object/unique identifier information across the devices to generate a match between respective objects sensed by the devices; and providing synchronization control to the devices, to permit an annotation of the matched object to be locked to a landmark and the plane of one of the devices with respect to others of the devices.

According to additional aspects, instructions are provided to the devices to grant rights or access to perform prescribed annotations.

According to other aspects, the method further comprises restricting or permitting annotation to certain users or objects, and in certain contexts or situations, either manually or automatically, based on a user input.

According to still other aspects, the receiving plane information includes receiving information on the users associated with the devices, or ambient sensed information from the devices.

According to yet other aspects, the devices comprise AR camera devices, and information received from the devices comprises one or more of geolocation, ambient conditions, user profile, user social graph or public information, where permitted by the user.

According to additional aspects, the matching comprises a context-aware operation that uses visual and semantic indicia to perform the matching, and the objects are similar but different in at least some aspects between ones of the devices.

According to still other aspects, the synchronization control comprises locking the annotation to the landmark and the plane, such that a movement of the object by one of the users permits the annotation to move therewith.

Additionally, a non-transitory computer-readable medium including instructions for augmented reality (AR) environment synchronization is also provided.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting.

As used herein, the term "users" generally refers to one or more entities that interact with the AR interface via an input device (e.g., camera or headset) to receive and/or enter information. Further, the users may be considered as host users or remote users. The term host user typically refers to the user that has initiated or hosted the AR interaction, whereas the remote users are typically users that are joining the AR interaction that was initiated by the host user. However, this relationship is just an example, and other ways of initiating the AR experience as would be understood by those skilled in the art they be substituted, without departing from the inventive scope.

While the above terms are used herein for the sake of simplicity, other terms may be substituted therefor to describe these relations as would be understood by those skilled in the art. Moreover, the term "entities" may refer to one or more individuals, account holders, owners of accounts and/or devices, organizations or other members that interact with the example implementations or perform processes thereon.

Aspects of the example implementations are directed to one or more systems and methods for a mixed reality AR environment, including a system and method for drop point or semantic coordination, and synchronization for collaborative systems and tools. This may be accomplished by providing, as a synchronization reference point, a mutually shared object that has been identified and localized, either visually or semantically, for shared landmarks across two or more sessions. As a result, communication via an AR environment may include synchronized annotations between multiple users.

More specifically, example implementations associated with the present inventive concept are directed to a method for providing synchronous, anchored, real-time annotations across similar media objects in an AR environment. For example, but not by way of limitation, in addition to recognizing a plane or an object and a plane pair in the AR environment, the example implementations are directed to recognizing and landmarking an object and a plane. The result of the recognizing and landmarking is maintained as a "lock", so as to keep two endpoints (e.g., plane associated with two peers in an AR environment) in synchronization.

According to the example implementations, two AR objects associated with two similar real-world physical objects in two different locations, may be localized the AR environment. It is noted that any two mappable objects may be employed in the present example implementation. The two objects may be exactly identical or substantially identical (e.g., exact duplicates or near duplicates). Further, the two objects may be dissimilar but mappable due to shared or common semantic properties. Semantic properties of the objects may be applied for synchronization in a context-aware manner. For example, the trunk of a station wagon in one user's environment and the hood of a sports car in another user's environment may be localized to each other based on a set of context-relevant properties (e.g., having hinge and latch, representing storage space, etc.).

According to the example implementations, the process of mapping objects may be interactive with one or more users, or may be performed semi-automatically or automatically. For example, but not by way of limitation, the example implementation may create bounding boxes, in the respective viewports. The bounding boxes may be generated automatically using computer vision, manually by users, or a combination thereof. More generally, the bounding boxes may be inferred, if a number of keypoints (e.g., a small number) are identified, and the identified keypoints are used to register an object, automatically using computer vision, manually by users, or a combination thereof.

Such bounding boxes may be boosted with domain knowledge. According to the above-described non-limiting example, the two objects may be a car and a truck that are localized due to shared semantic properties of the hood of the car and the hood of the truck as landmarks, for larger geometric coordination. In the example use case of a red and black chess board, one of the squares may be highlighted and indicated as "white" or any other color that is not the game space colors of that chessboard.

With regard to the generation of a visual or semantic match, a method is provided for computing a visual unique identifier or near-unique identifier. The computed visual or near unique identifier is robust against skewed orientations and perspectives. Optionally, the match may be semantic, as explained in further detail below. Two or more objects having substantially similar properties may be aligned or located. For example, but not by way of limitation, a lid of a flask and a lid of an insulated food or beverage container may be aligned or located.

With regard to the generation of a match, a determination is made whether two or more AR planes and visual unique identifiers constitute a match. According to the example implementations, this operation may be performed without plane match. For example, but not by way of limitation, an object that is in a first plane for the first user, such as a vertical plane on a wall, may be matched to a second plane, such as a non-vertical plane on a table, desk or the like, for a second user.

With regard to coordination of clients, this operation may be performed by a server, or peer to peer, and may involve one or more approaches. For example, but not by way of limitation, a strategy may be selected such that any new item in the AR environment is multicast to other peers in the AR experience. Another strategy may involve having any object that is in the process of being manipulated by a given user as being "locked" to other clients in the AR experience, until that manipulation by that user has been completed. The manipulation may be provided the one or more other users from the manipulating user as a series of updates, to render across the other client in real time.

According to the example implementations, a layer is added to the standard AR flow. This new layer includes a spatial synchronization point, so as to preserve annotations across a plurality of regions. Operations associated with the new layer are disclosed below with respect to the discussion of FIG. 3.

For example, but not by way of limitation, this approach may involve providing a n-tuple (e.g., triple) that includes {current location, transformation, new location}. These strategies are not limiting, and are merely examples of approaches that may be taken to coordinate clients. Other approaches may be taken without departing from the inventive scope, as would be understood by those skilled in the art.

Figure 2:
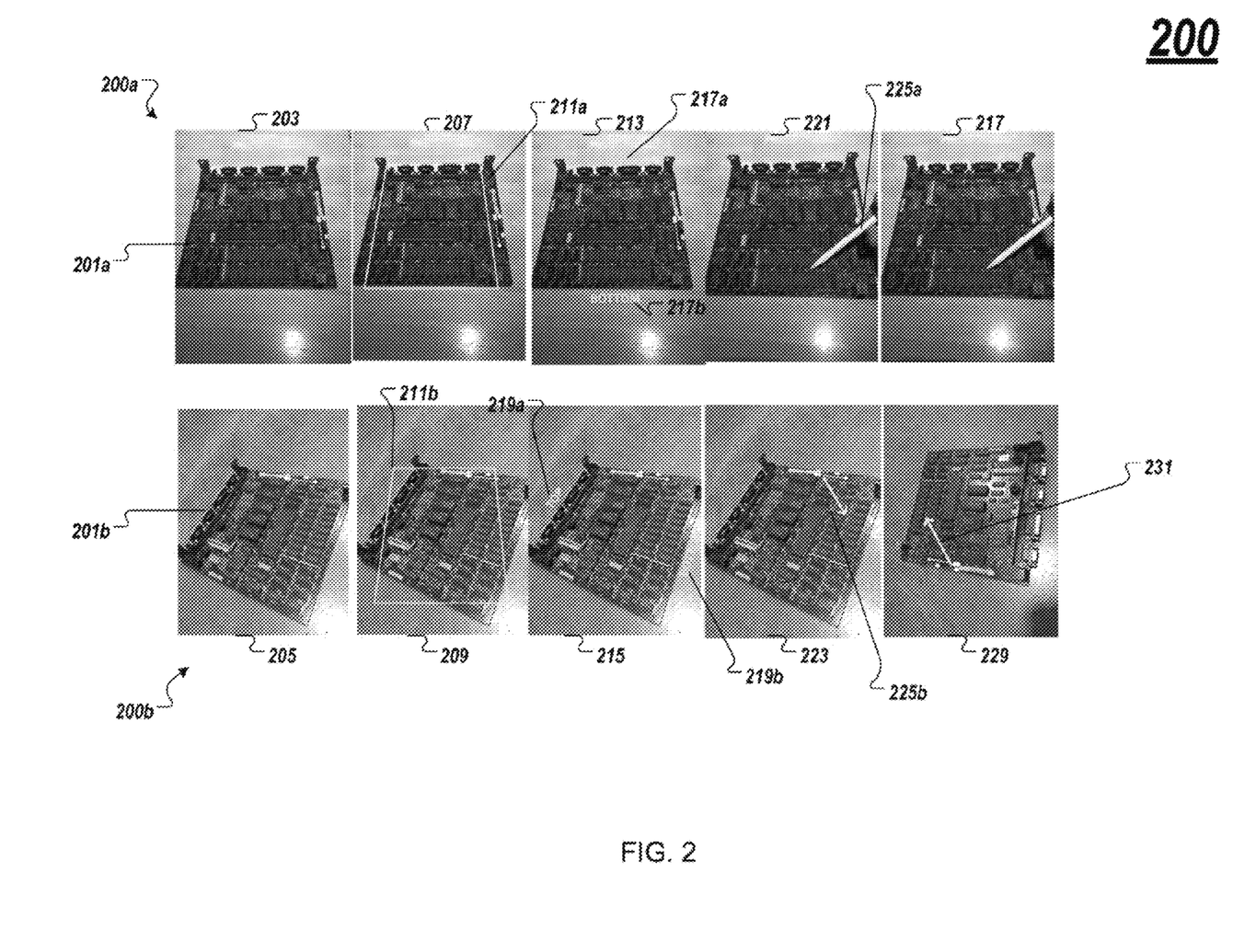
FIG. 2 illustrate aspects of a mixed reality AR experience according to an example implementation.

FIG. 2 illustrates aspects of a mixed reality AR experience 200 according to an example implementation. More specifically, images 200a is directed to a host user, and images 200b is directed to a remote user. In this example implementation, both users have a physical motherboard 201a, 201b. This physical environment is illustrated at 203 for the host user, and 205 for the remote user.

As shown in 207 and 209, and AR technology maps planes 211a and 211b, for the host user and the remote user, respectively. This mapping may be performed either automatically using visual analysis, or manually, based on users identifying one or more matching points in each view, or using a combination thereof. For example, but not by way of limitation, the mapped planes may be in a horizontal, vertical, or other plane. As can be seen in the drawings, the planes 211a, 211b do not match. This is because the host user and the remote user are not physically oriented in an identical plane.

As shown in 213 and 215, computer vision is applied to perform object identification. The object identification may be performed by existing computer vision methods (e.g. the Hand3D reference that models the 3D geometry of the object of interest, or the like). Alternately, if keypoints are identified, the identified keypoints may be tracked, and the coordinate reference frame they define may be updated. This coordinate reference frame may be customized to include object specific attributes, which may enhance the collaboration. More specifically, each object is identified, and the orientation of each object is estimated. At this stage, the AR plane is maintained. Optionally, the host user and/or remote user may be provided with information, such as feedback indicative of a visual match, as an indicator to initialize synchronization. More specifically, the top and bottom of the host user, indicated by 217a and 217b, is not aligned with the top and bottom of the remote user, indicated by 219a and 219b. As explained above, this non-alignment may be due to different physical orientations of the environments of the users.

At 221, the host user points to a location, which is mapped to the view of the remote user at 223. More specifically, the host user uses a pointer to 225a, and an arrow 225b is provided in the AR view of the remote user. In this case, the object to which the host user is pointing is a capacitor, which is a matched object.

At 227 and 229, the remote user performs a rotation of the object (e.g., moving the physical motherboard), and the annotation rotates along with the object, staying locked to its target capacitor. More specifically, this is shown in 229, as annotation 231. It is noted that the remote user physically stays still, and thus the AR plane stays constant.

In the absence of the forgoing correction operation that is performed when the remote user performs a rotation of the object, the annotation would stay in place, or stay anchored to the viewport, thus disassociating the annotation from the target capacitor.

While a pointer and an annotation mark are illustrated in FIG. 2, it is noted that annotations can also be shared. For example the arrow 225b on the remote user's view can be locked to the host user's view as well. As a result, either user may be provided with an option to manipulate the annotation. For example, but not by way of limitation, the arrow 225b may be moved from the capacitor as noted above, to a resistor in the center of the motherboard.

While the foregoing example implementation is provided with respect to a motherboard, this is for illustrative purposes only. Other AR uses involving other use cases may be substituted therefore without departing from scope of the present disclosure.

Figure 3:
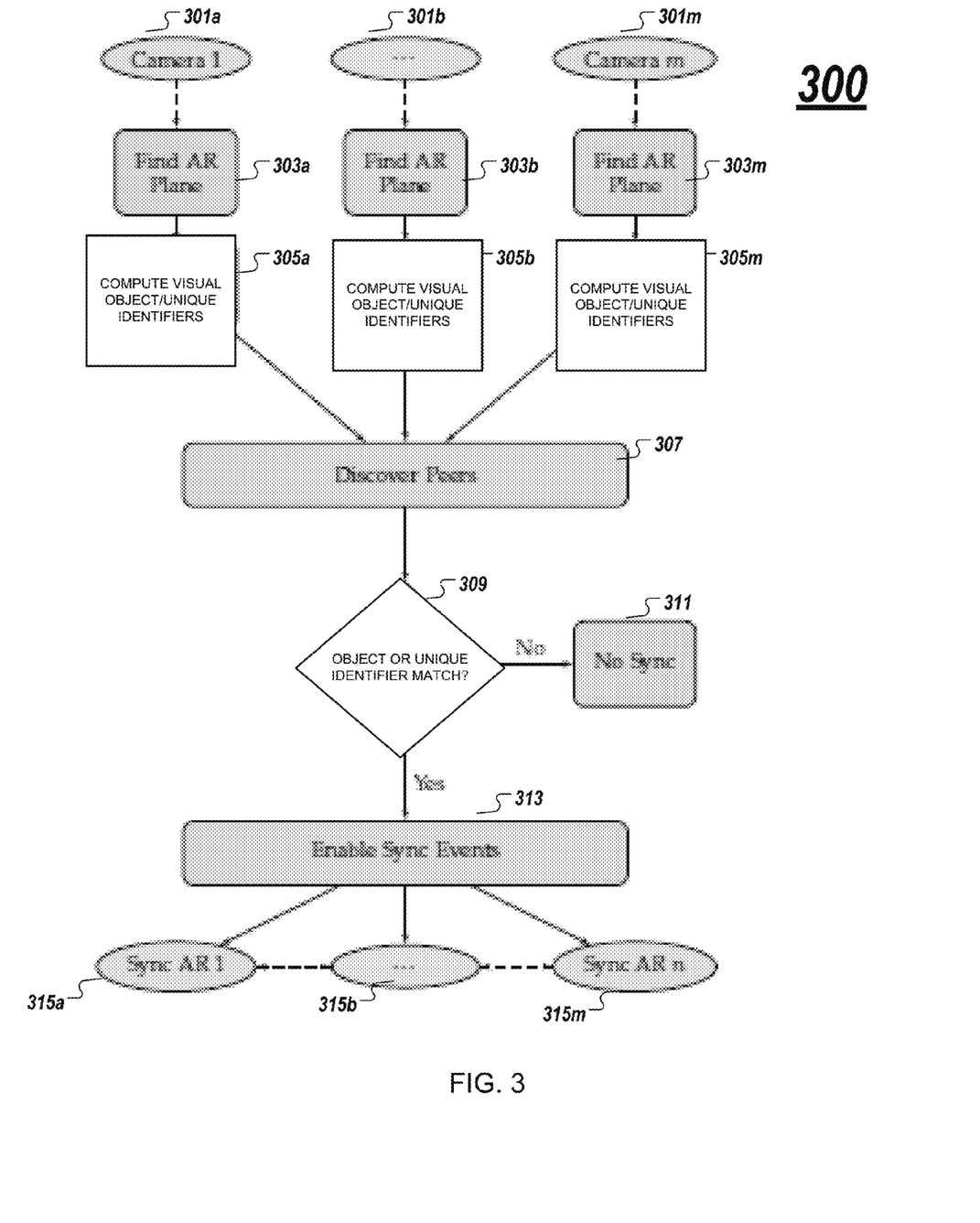
FIG. 3 illustrates a method for drop point for semantic coordination and synchronization according to an example implementation.

FIG. 3 illustrates a flow 300 for according to an example implementation. A plurality of users 1 . . . m are provided.

However, it is possible that the flow 300 may be directed to only a first and second user, in a peer to peer relationship, or a plurality of users, in a one to many relationship. Further, the relationship between the users may be host to remote, such that the host user is an initiator of the AR view, or in some manner controls the AR experience, and the remote user is a participant invited to join by the host user. Alternatively, the users may all be peers and the control or initiation of the AR experience may be transferred statically or dynamically or not at all between users 1 . . . m.

According to the example implementation, corresponding inputs 301a, 301b . . . 301m are provided for each of users. For example, not by way of limitation, the inputs 301a, 301b . . . 301m may be sensors or audio-visual inputs, such as a camera. For explanatory purposes, cameras are used in the description of this example implementation. However, the inputs are not limited thereto, and other inputs may be substituted therefor, as would be understood by those skilled in the art.

Given a set of cameras as inputs 301a, 301b . . . 301m, each of the cameras is associated with an AR plane at operations 303a, 303b . . . 303m, respectively, as explained above. Once the AR planes have been determined, for each plane, one or more unique identifiers are generated along with a set of visual or semantic characteristics (e.g., referred to as a "hash" or "identifier, but not limited thereto) at 305a, 305b . . . 305m, such as by calculation, for determining the origin (not just the object). Subsequently, a discovery operation is employed to coordinate the cameras at 307 (e.g., peer discovery). The coordination of cameras may be an existing automatic, manual or invitational operation, as would be understood by those skilled in the art.

After the camera coordination has been performed, at 309 the unique identifiers are matched or near matched, based on a subset of visual and/or semantic characteristics. As explained above, the objects can be matched based on visual characteristics, semantic basis such as function, category basis, and/or external context history. If it is determined that there is no match, then no synchronization is performed across users, as noted at 311.

On the other hand, if it is determined that there has been a match, at 313, synchronization events are enabled. Further, planes can be matched, such as in a horizontal or vertical orientation. Accordingly, if there is a match across any subset of devices, coordination is arranged among the peers, and an output is provided for synchronization at 315a, 315b . . . 315m, for each of the users.

According to the foregoing example implementations, one or more users may be provided with control and/or capability to coordinate the AR views, based on one or more points. The coordination is performed based on object or unique identifier matching, which may be based on visual, semantic, category, functional, and/or context basis. To the extent that context matching is performed, this context matching need not be associated with visual indicators. For example, but not by way of limitation the context matching could be based on other sensory inputs such as Geo, temperature, humidity, light exposure or others.

The context-based matching may be object to object, or annotation based. According to this approach, when one of the users in the AR environment performs an action, such as manipulating an object, this action results in a grant of access to perform the task in a manner that appropriately shares the annotation with other users in the AR environment. Views of the other users may be updated accordingly.

Optionally, annotation properties in the AR environment may be controlled in a manner that permits or restricts propagation of certain annotations. For example, but not by way of limitation, certain objects may be indicated (e.g., tagged by a user) as being solid in nature, or may be blocked by other visually present features in the AR environment. One user may be able to control how other users view or annotate an object. Thus, a user may prevent or block annotations that would penetrate or be moved through a solid object, so as to impose a real-world constraint on AR objects, in order to create a more real-world AR experience.

Conversely, a user may permit annotations to pass through solid objects, to provide illustrative uses for other users. In a peer-to-peer example, a physically impossible real-world action such as pointing through a laptop computer to an internal element of a laptop computer, may be permitted. Thus, a user may have varying degrees of control as a presenter, by tagging certain real-world objects, for example, to impose real-world limitations on solid objects, or permit physically impossible actions. Dragging an annotation across or through a solid object is merely an example; other actions may also be similarly controlled by providing the user (e.g., presenting user) with the ability to tag and categorize objects, such that they are treated in a manner that is desired by the user.

Such settings may be applied to create classes of objects, and the settings may be terminated on a per session basis, or saved across sessions (e.g., same peers and objects in the same place in future sessions). A user may create an initial classification of objects, and then add settings on a per-class basis. For example, a user that is presenting information on cooking in an AR environment may tag certain objects that can be passed through by annotation (e.g., gelatin) and other objects that are solid (e.g., garlic).

Further, objects may be tagged, either manually by the user or automatically by the system as semantic equivalents. For example, butter and cooking oil, or even different types of cooking oil, may be semantic equivalents in the context of certain cooking environments.

The present example implementation is primarily directed to a substantially flat object. However, the example implementations are not limited thereto, and other example implementations may be substituted therefore without departing from the inventive scope. For example, but not by way of limitation, instead of using a primarily flat object, a 3-D object (e.g., robot using a vertical plane) or a totally flat object (e.g., printed article) may be used.

Additionally, information associated with the users themselves can be used to determine or change the context-aware approach (e.g., in a representation of a car in an AR environment, a novice may not be provided with a distributor as an object, whereas an expert may be provided with a distributor as an object, and/or the ability to annotate the distributor). Such an approach may be used to keep users at the same level in synchronization (e.g., novices may avoid confusion, or experts may experience more technical details), or allow an expert to communicate to a novice by leveraging the context gap. Such context-relevant information may be obtained, for example, from metadata, social media information, preferences in a user profile, historical AR environment behavior, or the like.

Alternatively, some objects may be provided in a manner that is transparent, or requires other objects to be transparent, such that exploded views or abstract views may be provided. According to these example implementations, a user is provided control to enable or disable certain actions for objects and/or annotations that they have created. A user may create classes of objects, or apply filters selectively.

Optionally, a history slider may be provided that allows for object information to be controlled, or about annotation, depending on history.

In addition to providing a basis for matching objects, the context-aware matching by also provide a recommendation to not match objects, based on a lack of context, or improper context, including not just visual location, but other contexts. For example, two users may have their computer peripheral (e.g., mouse) matched if they are not in a context-appropriate geo-location (e.g., one user in an office and another user in a private area, such as home or bedroom). The users may receive a recommendation to not match objects, or such a match may be blocked automatically by the system. Thus, the example implementation may include deterrence if the context does not exist, or the context matching is negative.

Computer vision and AR may be applied to receive information of the user environment, such as ambient information, to determine context, and then apply the determined context information to perform the matching. This information of the user environment may be visual, but is not limited thereto. For example, but not by way of limitation, other information may include geolocation, demographic (e.g., based on user profile or publicly available information), metadata, behavioral, historical, social graph, or based on a role with respect to other users. Further, one user may be human, and another user non-human (e.g., robot such as an hostile environmental conditions, but not limited thereto).

Further, it is noted that the example implementations are not limited to a single object in the environment being matched, and may include the matching of multiple objects in the environment for the plurality of users in the AR environment.

With respect to the locking (synchronization) of the annotation across multiple users (e.g., peers), additional features may be provided. Remote users may be encouraged to perform annotations in a critical path, or discouraged from providing annotations in an incorrect sequence. For example a remote user that begins to disassemble an electronic device prior to disconnecting the power supply may be warned or prevented to performing subsequent operations in the AR environment, until the power supply has been disconnected.

In the forgoing approaches, it is noted that the AR plane is mapped to non-located objects. Further, an operation is provided for translation between two non-located planes and objects. In addition, a system is provided that coordinates across a set of peers, and architecture as would be understood by those skilled in the art, such as peer-to-peer or client/server.

Shareable annotations are provided across AR planes, and an object may be locked, along with environments, to a session, where two or more users are commonly placed with the same object, so as to be able to retrieve annotations. It should be noted that the interaction can be one to many, many to many and involve human users, robot agents, or a combination thereof. As would be understood by those skilled in the art, robot and human may have different annotation requirements.

According to an example implementation, one or more measures of performance may be employed for evaluation purposes. For example, but not by way of limitation, a measure of performance may include measurement of the accuracy of pinpointing areas of an object across distance as shown in FIG. 2, and/or the connected experience between two individuals. Other measures of performance may be substituted therefor, without departing from the inventive scope.

Figure 4:
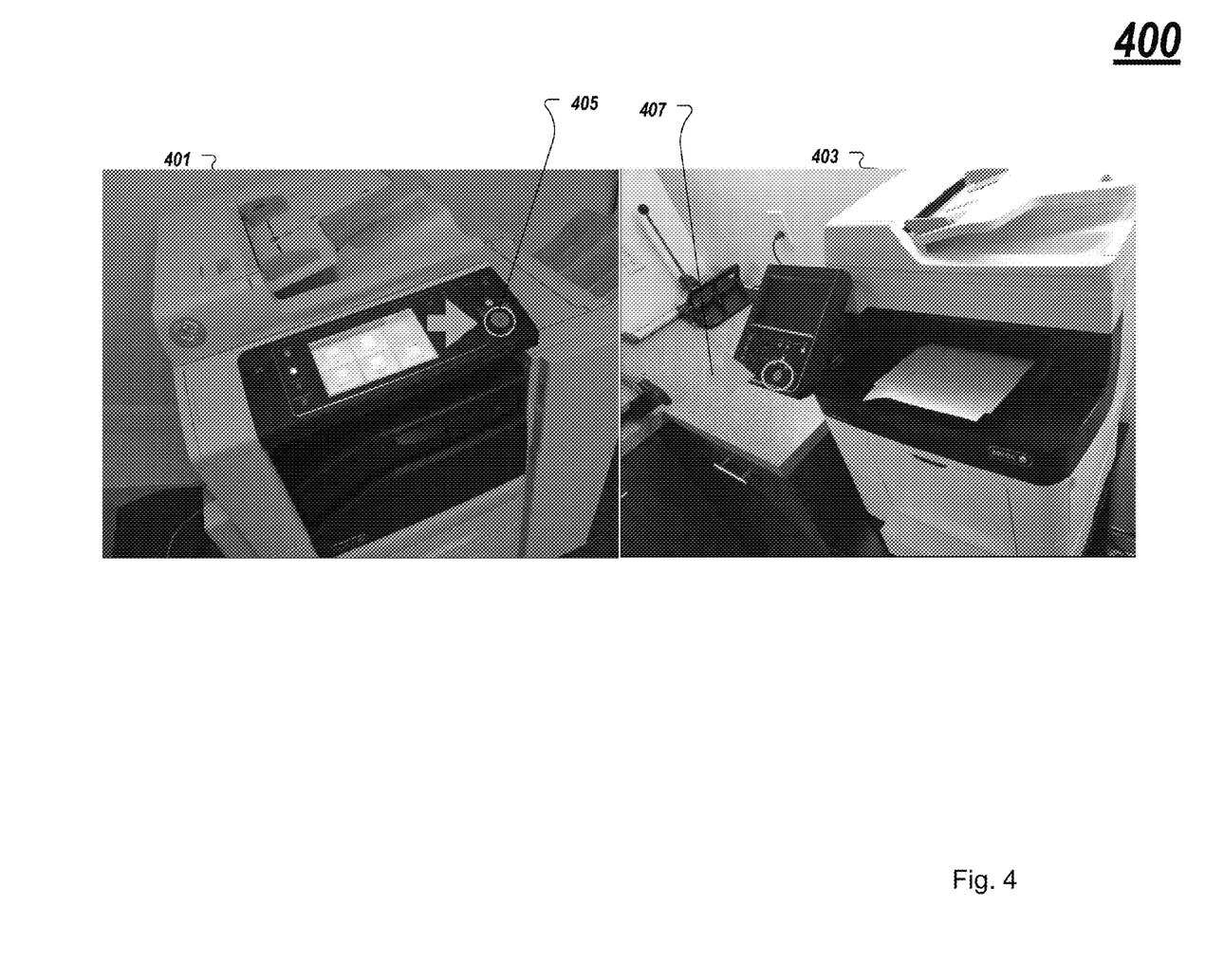
FIG. 4 illustrates an AR annotation according to a use case of the example implementation.

FIG. 4 illustrates an example implementation 400 directed to a multi-function device (MFD) printer. A host environment 401 and a remote environment 403 are provided. A user a user in the host environment 401 drops an AR annotation 405 on the Start button of an MFD. According to the example implementation, the corresponding annotation 407 locks to the remote's MFD Start button. In this example implementation, the annotation is semantically anchored, as opposed to being visually anchored. However, the example implementations are limited thereto, and other anchoring approaches may be used. For example, but not by way of limitation, optionally, the user at 403 may drag/move that annotation to the screen (e.g., to the right). Accordingly, the annotation at 401 may move left to its screen A non-limiting may involve the fashion industry. Tailors may collaborate on designing a new cloth (e.g., a teacher in Milan as a host, and students elsewhere in the world as remote users). At every site, a mannequin (e.g., foam model) is present. A remote user may draw on the mannequin in the AR view. Accordingly, the marks are replicated on the other sites with other remote users as well as the host user. When the marks are created, they can render different clothes over the real mannequin. Accordingly, real-time 3D human-pose estimators, as would be understood by those skilled in the art, may be used to track the positions of each mannequin from each video stream at that site.

Another non-limiting illustrative use may involve hand tracking. For example, customized gloves may be designed for a remote user. Alternatively, in a doctor-patient scenario, for a body part of a patient, the doctor as well as the patient may be able to annotate, or point that, certain party points. For example, the patient may be able to identify a pain point, or the doctor may be able to provide the patient with information on a target point. In another example implementation, therapy may be provided for a patient, by a therapist pointing to a location where the patient should take an action, such as applying pressure to a pressure point.

For the foregoing non-limiting example, off-the-shelf, real-time 3D hand-pose estimators may be provided. Such estimators may include, but are not limited to, Hand3D (https://github.com/lmb-freiburg/hand3d), or other tool as would be understood by those skilled in the art, to obtain and generate the 3D model of the hand and finger positions and map-created marks. According to this non-limiting example, a semantic mapping between two real objects (e.g., hands) that are not the same, but share semantic attributes for which a clear one-to-one mapping exists (e.g., five fingers and joints), is provided.

According to yet another non-limiting illustrative use, the example implementation may be used in an industrial setting. For example, but not by way of limitation, car designers at different sites may collaboratively input different designs (e.g., paint) over a car model. In that case, the car models do not necessarily need to match perfectly, as long as they each have a prescribed number (e.g., three) matching key-points to align their views in 3D. According to this example implementation, a car designer may try different color or design schemes, and interact with other remotely situated peers on the design aspects, to create the color options for a product line associated with the car model.

Figure 5:
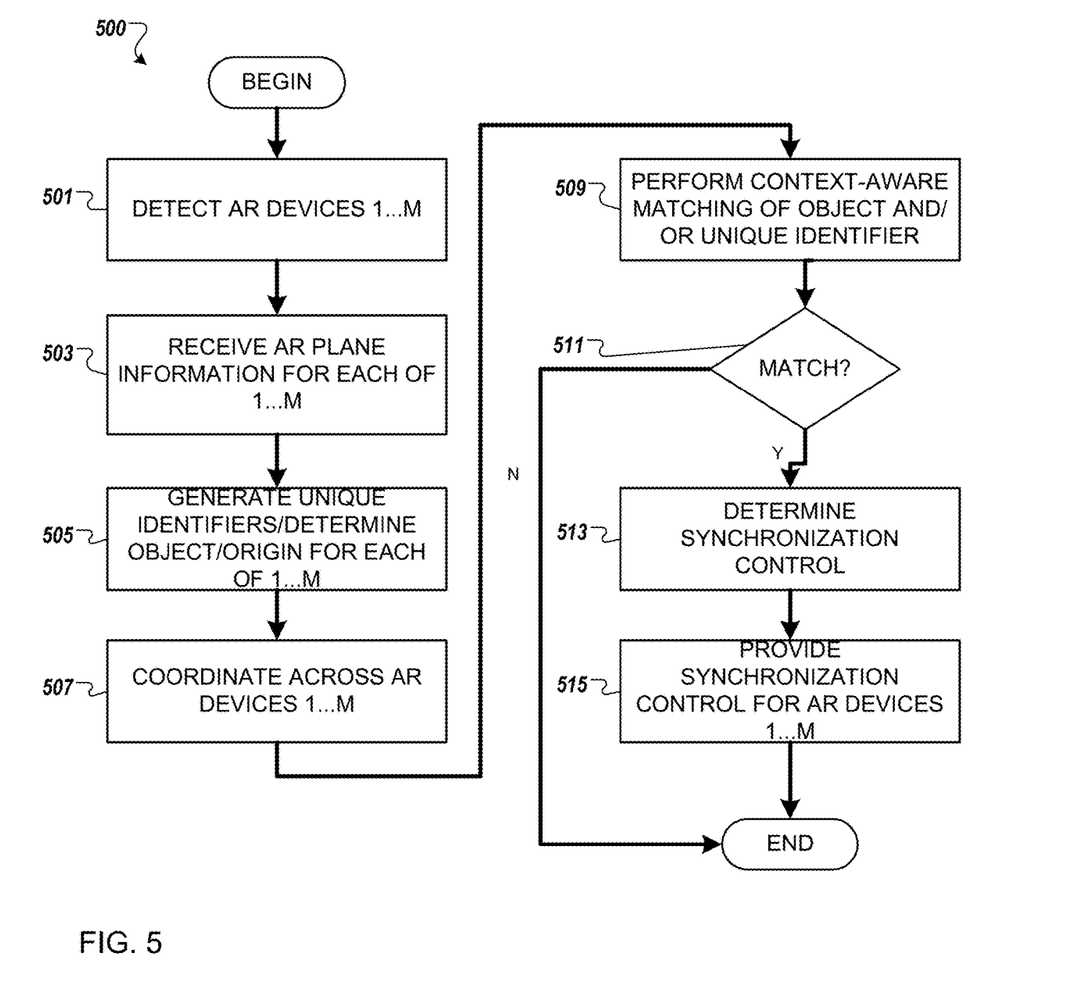
FIG. 5 illustrates a method in accordance with example implementations.

FIG. 5 illustrates an example implementation of a method 500 according to the example implementations. According to method 500, which is performed at the server side, matching an synchronization are performed according to the foregoing description and drawings.

At 501, a detection operation is performed to determine the presence of AR devices for input/output. The detection operation provides information on AR devices 1 . . . m that are associated with users participating in the AR environment event. Optionally, the determination step may provide information on the users associated with the AR devices 1 . . . m, ambient sensed information from the AR devices, or the like.

At 503, for each of the AR devices 1 . . . m, AR plane information is received. For example, the visual information received by the AR device, such as a camera, is received. Optionally, other information may be received, including but not limited to geolocation, ambient conditions, user profile, user social graph or public information, where permitted by the user, or other information relevant to the condition of the AR device and/or the associated user.

At 505, for each of the AR devices 1 . . . m, object determination and unique identifier generation is performed. Accordingly, visual and non-visual information is analyzed, such that an origin is determined for each object (e.g., physical object), as well as the generation of the unique identifier.

At 507, an operation is performed across devices 1 . . . m to recognize and aggregate the information of operations 501-505, for example. Thus, information of devices 1 . . . m is coordinated.

At 509, a matching operation is performed for the object or unique identifier, across the AR devices 1 . . . m. Accordingly, context aware matching is performed, for the identified objects in each of the AR devices in the AR environment. As explained further herein, the matching operation is a context-aware operation, and may use visual, semantic, or other indicia to perform the matching. Thus, objects that are similar but different in at least some aspects may be matched.

At 511, it is determined whether a match exists between objects of different AR devices 1 . . . m. If there is no match, the process terminates. If a match is determined to exist based on operations 509 and 511, then at 513, synchronization control is performed. For example, a synchronization may be locked to a landmark and AR plane, such that a movement of the base object by one of the users also permits the annotation to move. As a result, the user may move the object without having an adverse impact on the AR experience due to loss of annotation by decoupling from the AR plane, physical object or other similar reason.

Accordingly, instructions may be provided at 515 to the AR devices 1 . . . m to grant rights or access to perform certain annotations. As explained herein, a user may choose to permit or restrict annotation to certain users or objects, and in certain contexts or situations, either manually or automatically.

Figure 6:
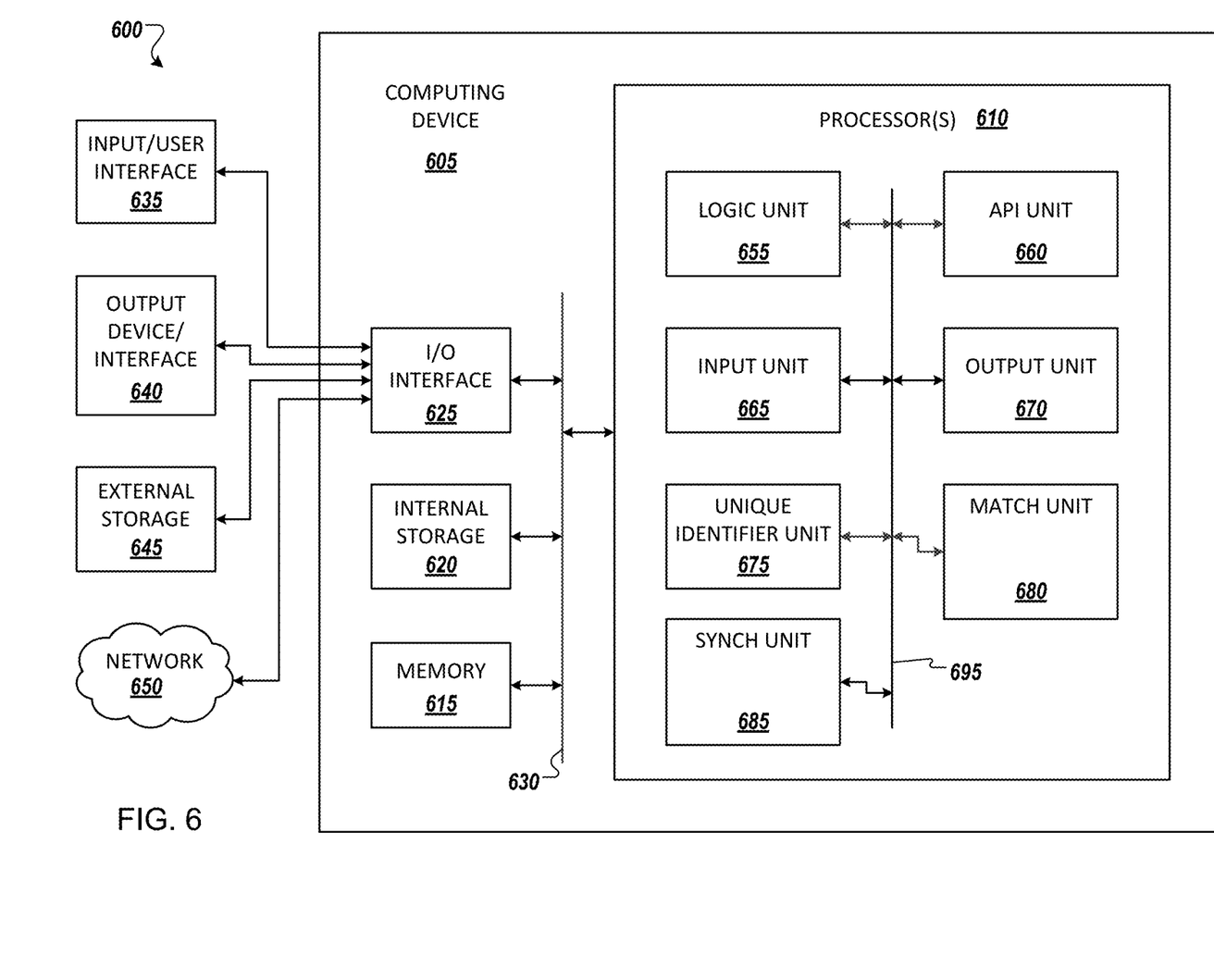
FIG. 6 illustrates an example computing environment with an example computer device suitable for use in some example implementations.

FIG. 6 illustrates an example computing environment 600 with an example computer device 605 suitable for use in some example implementations. Computing device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computing device 605.

Computing device 605 can be communicatively coupled to input/interface 635 and output device/interface 640. Either one or both of input/interface 635 and output device/interface 640 can be a wired or wireless interface and can be detachable. Input/interface 635 may include any device, component, sensor, or interface, physical or virtual, which can be used to provide input (e.g., buttons, touch-screen interface, keyboard, a pointing/cursor control, microphone, camera, braille, motion sensor, optical reader, and/or the like).

Output device/interface 640 may include a display, television, monitor, printer, speaker, braille, or the like. In some example implementations, input/interface 635 (e.g., user interface) and output device/interface 640 can be embedded with, or physically coupled to, the computing device 605. In other example implementations, other computing devices may function as, or provide the functions of, an input/interface 635 and output device/interface 640 for a computing device 605. These elements may include, but are not limited to, well-known AR hardware inputs so as to permit a user to interact with an AR environment.

Examples of computing device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 605 can be communicatively coupled (e.g., via I/O interface 625) to external storage 645 and network 650 for communicating with any number of networked components, devices, and systems, including one or more computing devices of the same or different configuration. Computing device 605 or any connected computing device can be functioning as, providing services of, or referred to as a server, client, thin server, general machine, special-purpose machine, or another label.

I/O interface 625 can include, but is not limited to, wired and/or wireless interfaces using any communication or I/O protocols or standards (e.g., Ethernet, 802.11xs, Universal System Bus, WiMAX, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computing device 605 can use and/or communicate using computer-usable or computer-readable media, including transitory media and non-transitory media. Transitory media includes transmission media (e.g., metal cables, fiber optics), signals, carrier waves, and the like. Non-transitory media included magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. One or more applications can be deployed that include logic unit 655, application programming interface (API) unit 660, input unit 665, output unit 670, unique identifier unit 675, match unit 680, synch unit 685, and inter-unit communication mechanism 695 for the different units to communicate with each other, with the OS, and with other applications (not shown).

For example, the unique identifier unit 675, the match unit 680, and the synch unit 685 may implement one or more processes shown in FIGS. 3 and 5. The described units and elements can be varied in design, function, configuration, or implementation and are not limited to the descriptions provided.

In some example implementations, when information or an execution instruction is received by API unit 660, it may be communicated to one or more other units (e.g., logic unit 655, input unit 665, unique identifier unit 675, match unit 680, and synch unit 685). For example, the unique identifier unit 675 may identify AR inputs such as cameras, determine an AR place, and computer visual object/unique identifier. The match unit 680 may perform context-aware matching based on semantics. Additionally, the synch unit 680 may permit synchronization of the AR environment between users (e.g., locking and annotation control).

In some instances, the logic unit 655 may be configured to control the information flow among the units and direct the services provided by API unit 660, input unit 665, unique identifier unit 675, match unit 680, and synch unit 685 in some example implementations described above. For example, the flow of one or more processes or implementations may be controlled by logic unit 655 alone or in conjunction with API unit 660.

Figure 7:
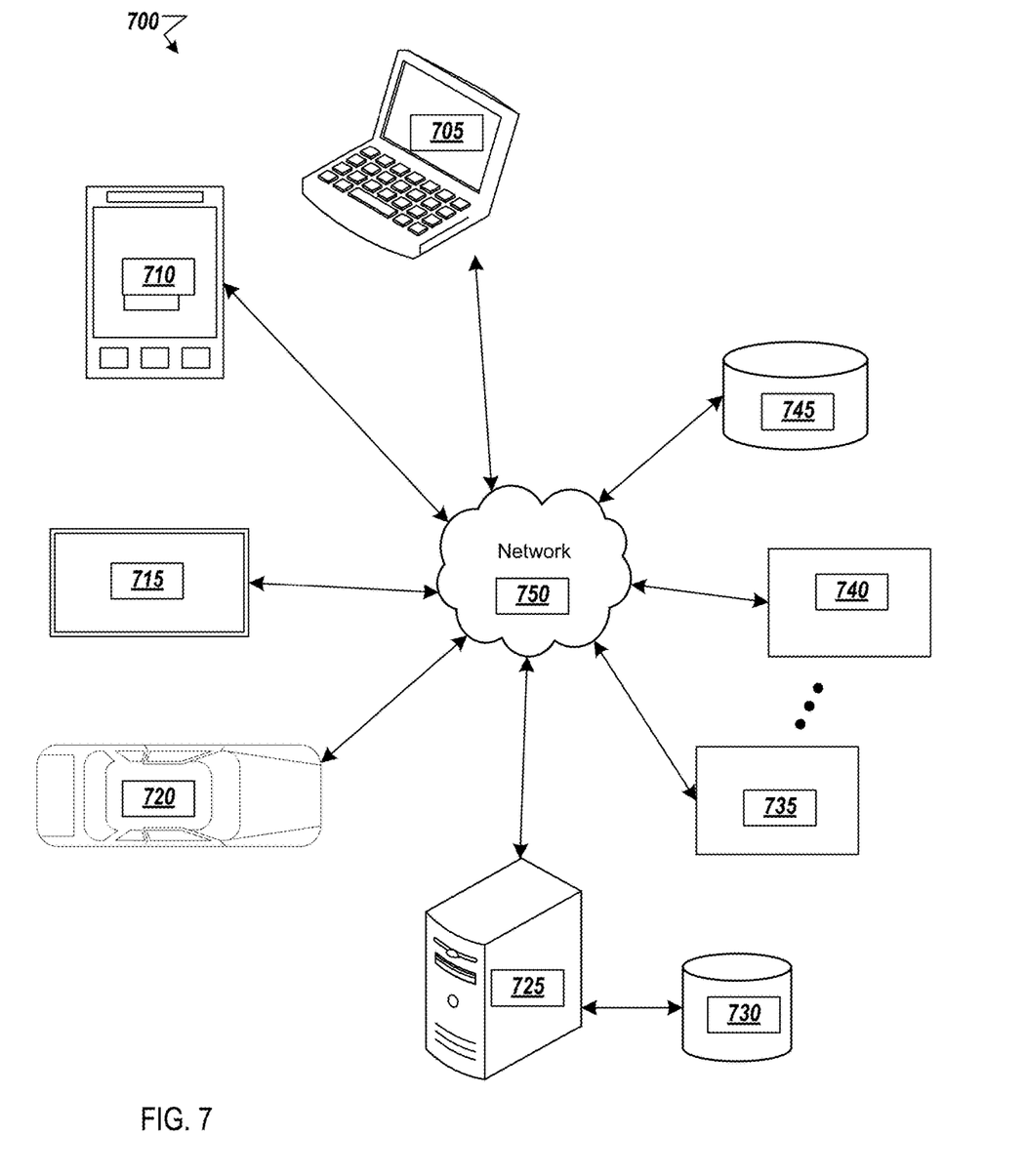
FIG. 7 shows an example environment suitable for some example implementations.

FIG. 7 shows an example environment suitable for some example implementations. Environment 700 includes devices 705-745, and each is communicatively connected to at least one other device via, for example, network 760 (e.g., by wired and/or wireless connections). Some devices may be communicatively connected to one or more storage devices 730 and 745.

An example of one or more devices 705-745 may be computing devices 605 described in FIG. 6, respectively. Devices 705-745 may include, but are not limited to, a computer 705 (e.g., a laptop computing device) having a monitor and as associated webcam as explained above, a mobile device 710 (e.g., smartphone or tablet), a television 715, a device associated with a vehicle 720, a server computer 725, computing devices 735-740, storage devices 730 and 745. The devices may be communicatively connected, including but not limited to AR peripherals that are well known in the art to permit a user to interact in AR, VR, mixed reality, or other environments.

In some implementations, devices 705-720 may be considered user devices associated with the users of the enterprise. Devices 725-745 may be devices associated with service providers (e.g., used by the external host to provide services as described above and with respect to the various drawings, and/or store data, such as webpages, text, text portions, images, image portions, audios, audio segments, videos, video segments, and/or information thereabout).

The example implementations may have various benefits and advantages. For example, but not by limitation and not as a requirement of the example implementations, the annotation can be rotated by a remote user, and the annotation remains locked to the object being annotated, such that the relationship between the annotation in the remote user AR view and the host user AR view remains consistent. Further, the user may be able to manipulate the real object, and such manipulations may be shared across multiple users.

In addition to the position, the example implementations provide for near-duplicate or semantic matching for its use in synchronization (e.g., hood of a car and of a truck, or two similar versions of the same motherboard). This effect may be accomplished visually using any near-duplicate reduction to practice. For example, but not by way of limitation, in FIG. 2, it may be possible to use SIFT/HOG descriptors and RANSAC matching or LOH/LOPQ. Semantic matching may be performed with a dense corpus of objects and relationships, as would be understood to those skilled in the art, e.g., annotated technical corpus.

According to the example implementations, an advantage may be that an object-match is made in conjunction with an AR plane, which provides a set of known transformations. Further, the example implementations are directed to synchronizing the collaborative annotations, which are anchored to objects in an AR plane. For example, as illustrated in images 2b of FIG. 2, an individual user (e.g., remote user) may manipulate their physical object without the transform being reproduced on the other end (e.g., host user).

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. An augmented reality (AR) environment synchronization method, comprising:
   for each of a plurality of devices associated with respective users in the AR environment:
      receiving plane information of a respective visual environment sensed by a respective device, each respective visual environment separately located from visual environments of the other devices and including a respective instance of an object sensed by the respective device, and
      generating object/ unique identifier information of the respective instance of the object;
   across the devices, coordinating the plane information;
   performing context-aware matching of the object/unique identifier information across the devices to generate a match between respective instances of the objects sensed by the devices, wherein to generate a match comprises determining the respective object/unique identifier information are substantially similar to each other; and
   when a match is generated, providing synchronization control to the devices, to permit an annotation of the matched instances of the object to be locked to a landmark included in the respective visual environment and the plane of one of the devices with respect to others of the devices.

2. The method of claim 1, wherein instructions are provided to the devices to grant rights or access to perform prescribed annotations.

3. The method of claim 1, further comprising restricting or permitting annotation to certain users or objects, and in certain contexts or situations, either manually or automatically, based on a user input.

4. The method of claim 1, wherein the receiving plane information comprises receiving information on the users associated with the devices, or ambient sensed information from the devices.

5. The method of claim 1, wherein the devices comprise AR camera devices, and information received from the devices comprises one or more of geolocation, ambient conditions, user profile, user social graph or public information, where permitted by the user.

6. The method of claim 1, wherein the matching comprises a context-aware operation that uses visual and semantic indicia to perform the matching, and the objects are similar but different in at least some aspects between ones of the devices.

7. The method of claim 1, wherein the synchronization control comprising locking the annotation to the landmark and the plane, such that a movement of the object by one of the users permits the annotation to move therewith.

8. The method of claim 1, wherein each of the respective visual environments is a distinct physical environment including a real instance of each respective object sensed by the device.

9. A non-transitory computer-readable medium including instructions for augmented reality (AR) environment synchronization, the instructions comprising:
   for each of a plurality of devices associated with respective users m the AR environment;
      receiving plane information of a respective visual environment sensed by a respective device, each respective visual environment separately located from visual environments of the other devices and including a respective instance of an object sensed by the respective device, and
      generating object/unique identifier information of the respective instance of the object;
   across the devices, coordinating the plane information;
   performing context-aware matching of the object/unique identifier information across the devices to generate a match between respective instances of the objects sensed by the devices, wherein to generate a match comprises determining the respective object/ unique identifier information are substantially similar to each other; and
   when a match is generated, providing synchronization control to the devices, to permit an annotation of the matched instances of the object to be locked to a landmark included in the respective visual environment and the plane of one of the devices with respect to others of the devices.

10. The non-transitory computer-readable medium of claim 9, wherein additional instructions are provided to the devices to grant rights or access to perform prescribed annotations.

11. The non-transitory computer-readable medium of claim 9, further comprising restricting or permitting annotation to certain users or objects, and in certain contexts or situations, either manually or automatically, based on a user input.

12. The non-transitory computer-readable medium of claim 9, wherein the receiving plane information comprises receiving information on the users associated with the devices, or ambient sensed information from the devices.

13. The non-transitory computer-readable medium of claim 9, wherein the devices comprise AR camera devices, and information received from the devices comprises one or more of geolocation, ambient conditions, user profile, user social graph or public information, where permitted by the user.

14. The non-transitory computer-readable medium of claim 9, wherein the matching comprises a context-aware operation that uses visual and semantic indicia to perform the matching, and the objects are similar but different in at least some aspects between ones of the devices.

15. The non-transitory computer-readable medium of claim 9, wherein the synchronization control comprising locking the annotation to the landmark and the plane, such that a movement of the object by one of the users permits the annotation to move therewith.

16. The non-transitory computer-readable medium of claim 9, wherein one or more of the respective users is provided with control over the context-aware matching, and the context-aware matching is based on at least one of visual, semantic, category, functional, and context features in response to at least one of visual, geolocation, temperature, humidity, and light exposure inputs.

17. The non-transitory computer-readable medium of claim 9, wherein the annotation properties in the AR environment is controlled to permit or restrict propagation of the annotation through the matched objects, based on a user indication of a status of the matched objects.

18. The non-transitory computer-readable medium of claim 9, wherein the annotation properties of the matched objects in the AR environment are controlled based on a characteristic of one or more of the respective users.

19. The non-transitory computer-readable medium of claim 18, wherein the characteristic comprises at least one of metadata, social media information, preferences in a user profile, and historical behavior associated with the one or more of the respective users.

20. The non-transitory computer-readable medium of claim 9, wherein computer vision and AR are applied to determine context, and perform the matching, based on at least one of geolocation, demographic, metadata, behavioral, historical, social graph, role of the respective users, and human or non-human status of the respective users.

\* \* \* \* \*